(Model.)  3 Sheets—Sheet 1.

A. N. KEIGWIN & W. G. TALLEY.
FRUIT PARER.

No. 295,874.  Patented Mar. 25, 1884.

Witnesses:

Inventor.

(Model.)                                              3 Sheets—Sheet 2.

A. N. KEIGWIN & W. G. TALLEY.
FRUIT PARER.

No. 295,874.                                  Patented Mar. 25, 1884.

Witnesses:
John C. Cole
Frank R. Carewell

Inventor:
A. N. Keigwin
William G. Talley (Model.)  3 Sheets—Sheet 3.

A. N. KEIGWIN & W. G. TALLEY.
FRUIT PARER.

No. 295,874. Patented Mar. 25, 1884.

Witnesses:
Francis H Hoffecker
E. W. Pierson.

Inventor:
Albert N. Keigwin
William G. Talley
per J H Hoffecker h. Atty

UNITED STATES PATENT OFFICE.

ALBERT N. KEIGWIN AND WILLIAM G. TALLEY, OF WILMINGTON, DEL.

FRUIT-PARER.

SPECIFICATION forming part of Letters Patent No. 295,874, dated March 25, 1884.

Application filed April 12, 1882. (Model.)

*To all whom it may concern:*

Be it known that we, ALBERT N. KEIGWIN and WILLIAM G. TALLEY, citizens of the United States, residing in the city of Wilmington, county of New Castle, and State of Delaware, have invented a new and useful Improvement in Fruit-Paring Machines, of which the following is a specification.

Our invention relates to certain improvements in that class of apple-parers in which the rotation of the fork is suspended at intervals for the placing of fruit thereon without interfering with the movement of the other parts of the machine, as will be hereinafter fully described, and specifically set forth in the claims.

Figure 1:
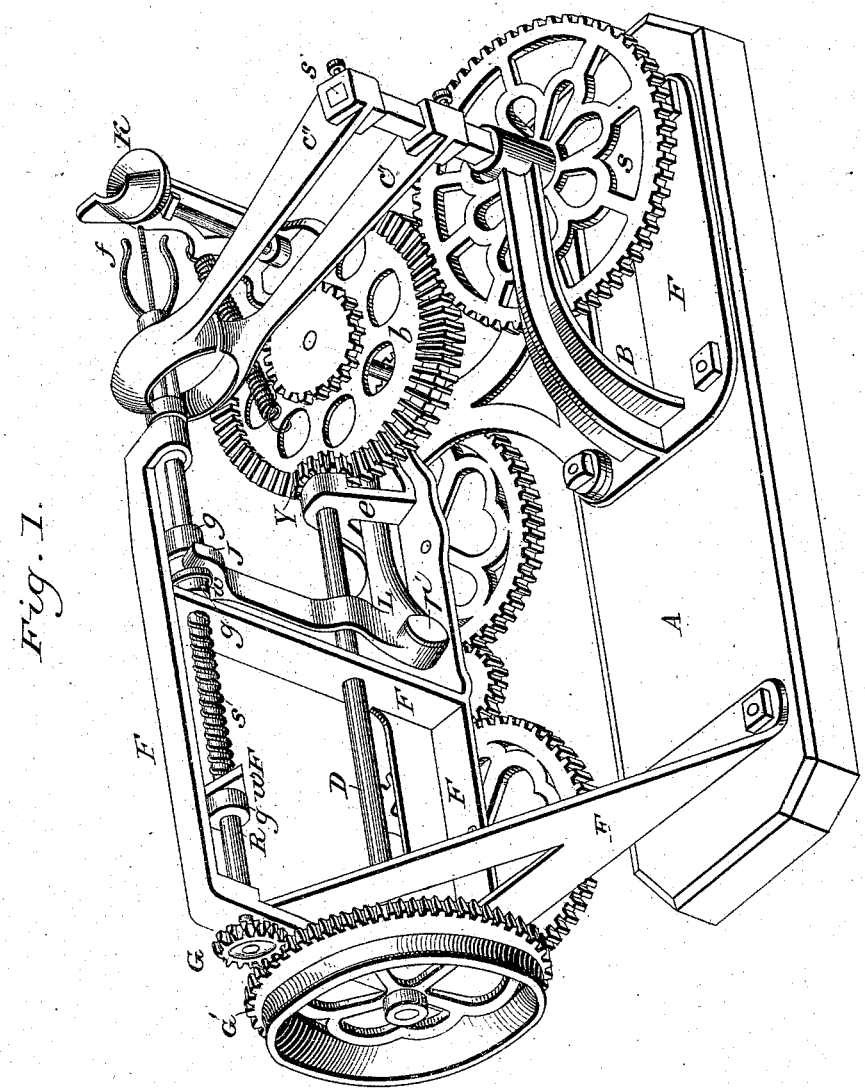
Figure 2:
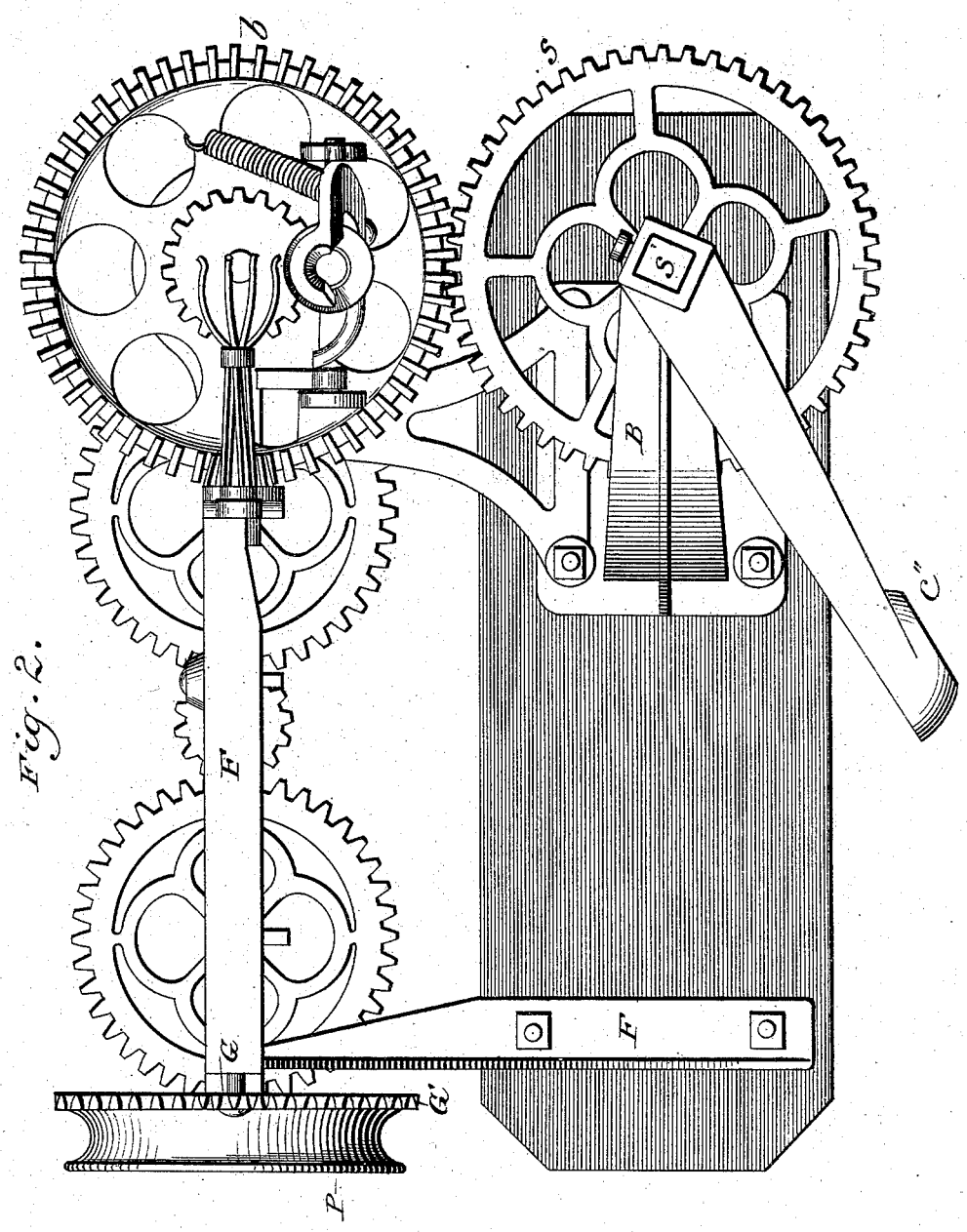
Figure 3:
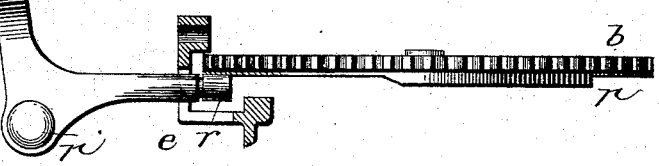

In the accompanying drawings, forming part of this specification, Figure 1 is a perspective view of our improved machine; Fig. 2, a plan view; and Figs. 3, 4, and 5 are detail views of detached parts of the machine.

Similar letters refer to similar parts throughout the several views.

The frame F F F F and doffing-bracket B constitute the frame-work of the machine, and are fastened by screws to a wooden plate, A. A shaft, D, carrying a cog pinion-wheel, Y, engages with the cog turn-table b, from which the power is derived which revolves the said turn-table. This combination is not claimed as part of our invention; but upon it depends the attainment of the objects claimed in providing a reciprocating motion to the fork-rod R, and by which the doffing mechanism also is actuated, which is described hereinafter. The shaft D revolves in the frame F, as seen in Fig. 1. The pulley P, which is the source of the power to the mechanism, is formed with a cog-wheel, G', and when the cog-wheel G' is in gear with the cog pinion-wheel G, attached to the fork-rod R and the fork f, these are caused to revolve. The cogs of G and G' are tapered in the direction of their axes. While the fruit is being pared by the knife K, the cog-wheels G and G' are in gear and the rod R and fork f are revolved; but in order to afford facilities for removing the fruit after it has been pared without stopping or intermitting the flow of motive power to the other parts of the machine there is formed on the back of the cogged turn-table b the cam projection p, which, as the turn-table revolves, comes in contact with the lever L, Figs. 1 and 3, through the medium of the roller r, Fig. 3, which, by means of the incline, is raised to the top or extremity of the projection p, and is kept in that position until the end of the projection has reached and passed it, when it drops to its former position. These operations cause the lever L to vibrate about the point p'. The tendency that the lever L would have toward bending is overcome by its being supported by the slotted part of the frame F at e, Fig. 1, in which slot it works. The end of the other arm of the lever L is formed with the jaw J, which engages with the fork-rod R in a grooved collar, g, Figs. 1 and 3, which is secured to the rod R, and thus, when one end of the lever L is raised on the cam projection p of the turn-table b, the jaw J on the other arm of the lever L draws the fork-rod R, with its cog pinion-wheel G, by a lateral movement, out of gear with the cog-wheel G'. At this point the doffers c" c" are brought into contact with the fruit by the following device: The turn-table b is provided with spur and crown teeth, the latter gearing with pinion Y, and the former driving a spur-wheel, s. This spur-wheel s is fastened to a shaft, s', Figs. 1 and 2, which revolves, supported in a bracket, B, that forms a part of the frame of the machine. The shaft s' is in a proper position for operating when its spur-wheel s is set so that the doffers shall be brought in contact with the fruit as soon as the knife K is lifted sufficiently to allow the fruit to be pushed off. The rotary paring-knife K is operated by a train of gearing connecting the driving-wheel G' with a pinion on the shaft of the said knife in a well-known manner, which it is not necessary here to further describe, as we lay no claim to such mechanism or rotary knife. After sufficient time has been allowed for the pared fruit to be removed by the mechanism just described and unpared fruit to be placed on the fork, then the fork-rod R and its cogged pinion-wheel G are again brought into gear with the cog-wheel G' by the following means: A spring, S, is compressed between the frame F and the collar g', which collar is secured to the rod R by means of a set-screw, as shown in Fig. 4.

Figure 4:
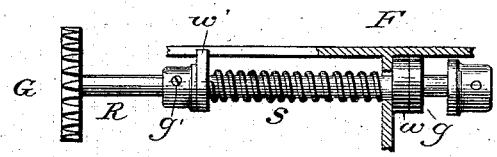
Figure 5:
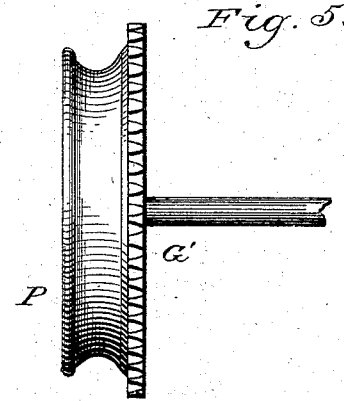

Between the collar g' and the spring S is placed a metallic washer, w', which is loose upon the rod R, and is prevented from turning by the projection shown, Fig. 4, resting on the frame F. The object of the washer w' is to overcome the tendency to revolve which the spring S would receive if in contact with the collar g'. w is a gum washer for taking the thrust of the spring S.

In order to facilitate the return into gear of the cog pinion-wheel G with the cog-wheel G', attached to the pulley P, their cogs are tapered, as shown, in the direction of their axes.

What we claim as our invention in the foregoing-described points are the following, upon which we desire to secure Letters Patent:

1. In a fruit-paring machine, the combination of a projection, p, upon a cogged turn-table, b, operating a lever, L, through the medium of a roller, r, on one arm of said lever, while the other arm is in gear with the sliding spring-operated fork-rod R through the medium of the jaw J and the grooved collar g, all substantially as set forth.

2. The combination of the fork-rod R, capable of a rotary and a lateral sliding movement by means of the pinion G and pivoted bell-crank lever L, having a fork or yoke thereon, with the spring S on said rod R, bearing at one end against the frame F, and at the other end against a loose washer, w', said washer being prevented from turning on said rod by means of a projection of said washer engaging the edge of the frame, substantially as set forth.

3. In a fruit-paring machine, the combination of the fork-rod R, having bearings in the stationary frame F, with the pinion-wheel G and spur-wheel G', these wheels having cogs tapered in the direction of their axes, respectively, and said rod R having a lateral sliding movement greater than the width of the face of the pinion-wheel G, whereby, through the medium of the lever L, a cessation in the revolution of the fork f is caused, while the balance of the machinery continues to operate uninterruptedly.

4. In a fruit-paring machine, the combination of the spur-wheel s with the cogged turn-table b, provided with spur and crown teeth, with the bracket B, the shaft s', and the doffer-arms and cups c'' c'', all substantially as set forth and herein specified.

5. The frame F, provided with the horizontal parallel rods R D, the former carrying the pinion G, grooved collar g, and fruit-fork, and the latter carrying the pulley and driving gear-wheel P G', for rotating the rod R, and a pinion, Y, for rotating the turn-table b, in combination with the bell-crank lever L, pivoted to frame F in rear of the said rods, and engaging the grooved collar g with one end, and the other end bearing on the under side of the turn-table, which is provided with a cam projection, p, for operating said lever, whereby said lever will be rocked, causing said rod R to be thrown out of gear with the rod D, substantially as set forth.

6. The bell-crank lever L, pivoted to the frame F, one end of said lever engaging the fork-rod R, and the other end engaging the turn-table, the end engaging the turn-table being provided with slotted bearings e in the frame F, whereby bending of the lever is prevented, and means of support and guidance is afforded the lever, substantially as set forth.

7. An apple-parer consisting of the two parallel horizontal rods R D, mounted in frame F, and geared together by gear-wheels G G' at their outer ends, the fork f, collars g g' w', and spring S on said rod R, the bell-crank lever L, engaging said collar g with one end, and the under side of the table-wheel with its other end, said table-wheel having crown-teeth on its face and spur-teeth on its periphery, the former meshing with cog-wheel s, whose shaft s' has bearings in the bracket B, and is provided with the cup-shaped doffer-arms c'' c'', substantially as set forth.

In testimony that we claim the above we sign our names in the presence of two witnesses.

ALBERT N. KEIGWIN.
WILLIAM G. TALLEY.

Witnesses:
FRANK R. CARSWELL,
JOHN C. COLE.